(12) United States Patent
Barzelay et al.

(10) Patent No.: US 10,607,107 B2
(45) Date of Patent: Mar. 31, 2020

(54) IDENTIFYING TEMPORAL CHANGES OF INDUSTRIAL OBJECTS BY MATCHING IMAGES

(71) Applicant: International Business Machines Corporation, Armonk, NY (US)

(72) Inventors: Udi Barzelay, Haifa (IL); Ophir Azulai, Tivon (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/566,923

(22) Filed: Sep. 11, 2019

(65) Prior Publication Data
US 2020/0005077 A1 Jan. 2, 2020

Related U.S. Application Data

(63) Continuation of application No. 15/846,248, filed on Dec. 19, 2017.

(51) Int. Cl.
*G06K 9/62* (2006.01)
*G06T 17/00* (2006.01)
(Continued)

(52) U.S. Cl.
CPC ............ *G06K 9/6202* (2013.01); *G06K 9/64* (2013.01); *G06T 7/001* (2013.01); *G06T 17/00* (2013.01);
(Continued)

(58) Field of Classification Search
CPC .... G06K 9/00637; G06K 9/6202; G06K 9/64; G06T 2215/16; G06T 7/001; G06T 17/00;
(Continued)

(56) References Cited

U.S. PATENT DOCUMENTS 5,710,709 A * 1/1998 Oliver ................ G05B 19/4067
700/184
8,429,174 B2 4/2013 Ramani
(Continued)

FOREIGN PATENT DOCUMENTS

| CN | 202050188 U | 11/2011 |
|---|---|---|
| CN | 205228648 U | 5/2016 |

OTHER PUBLICATIONS

"Compare Parts and Drawings", Solidworks, 3D CAD, printed from SolidWorks.com, downloaded on Aug. 24, 2017, 3 pages, <http://www.solidworks.com/sw/products/3d-cad/compare-parts-drawings.htm>.
(Continued)

*Primary Examiner* — Ali Bayat
(74) *Attorney, Agent, or Firm* — David B. Woycechowsky

(57) ABSTRACT

Technology for matching images (for example, video images, still images) of an identical infrastructure object (for example, a tower component of a tower supporting power lines) for purposes of comparing the infrastructure object to itself at different points in time to detect a potential anomaly and the potential need for maintenance of the infrastructure object. In some embodiments, this matching of images is done using creation of a three dimensional (# D) computer model of the infrastructure object and by tagging captured images with location on the 3D model across multiple videos taken at different points in time.

5 Claims, 11 Drawing Sheets

(51) Int. Cl.
*G06K 9/64* (2006.01)
*G06T 7/00* (2017.01)

(52) U.S. Cl.
CPC ............ *G06T 2207/10016* (2013.01); *G06T 2207/10032* (2013.01); *G06T 2207/30184* (2013.01); *G06T 2215/16* (2013.01)

(58) Field of Classification Search
CPC .......... G06T 2207/10032; G06T 2207/30184; H04N 7/185; G05D 1/10; G06F 9/04815
USPC ........................................................ 382/154
See application file for complete search history.

(56) References Cited

U.S. PATENT DOCUMENTS

| | | | |
|---|---|---|---|
| 8,831,284 B2 | 9/2014 | Thueux | |
| 9,022,109 B2 | 5/2015 | Nguyen | |
| 2003/0038822 A1 | 2/2003 | Raskar | |
| 2008/0310735 A1 | 12/2008 | Theiler | |
| 2010/0215212 A1 | 8/2010 | Flakes, Jr. | |
| 2012/0250010 A1 | 10/2012 | Hannay | |
| 2012/0262708 A1* | 10/2012 | Connolly | B64C 39/024 356/237.2 |
| 2013/0169681 A1 | 7/2013 | Rasane | |
| 2017/0046873 A1 | 2/2017 | Terry | |
| 2017/0227470 A1* | 8/2017 | Cesarano | G05D 1/0214 |
| 2018/0276995 A1* | 9/2018 | Priest | G08G 5/006 |
| 2018/0321692 A1* | 11/2018 | Castillo-Effen | G05D 1/0094 |
| 2018/0329433 A1* | 11/2018 | Zhao | G05D 1/0276 |
| 2019/0014310 A1* | 1/2019 | Bradski | H04N 13/246 |
| 2019/0188521 A1 | 6/2019 | Barzelay | |

OTHER PUBLICATIONS

"Quality Control Inspection", Shape Grabber, downloaded on Aug. 24, 2017, 3 pages, <http://www.shapegrabber.com/applications/by-need/quality-control-inspection/>.

Rothganger et al., "Segmenting, Modeling, and Matching Video Clips Containing Multiple Moving Objects", Proceedings of the 2004 IEEE Computer Society Conference on Computer Vision and Pattern Recognition (CVPR'04), 3 pages, © 2004 IEEE.

Stent et al., "Precise Deterministic Change Detection for Smooth Surfaces", Published in: Applications of Computer Vision (WACV), 2016 IEEE Winter Conference on Mar. 7-10, 2016, DOI: 10.1109/WACV.2016.7477622, Lake Placid, NY, USA, 9 pages.

Zhao et al., "Detecting Insulators in the Image of Overhead Transmission Lines", D.-S. Huang et al. (Eds.): ICIC 2012 LNCS 7389, pp. 442-450, 2012, © Springer-Verlag Berlin Heidelberg 2012.

List of IBM Patents or Patent Applications Treated as Related, Filed Sep. 11, 2019, 2 pages.

* cited by examiner 404a  404b

404

406a  406b

406

IDENTIFYING TEMPORAL CHANGES OF INDUSTRIAL OBJECTS BY MATCHING IMAGES

BACKGROUND

The present invention relates generally to the field of computerized comparison of images (for example, video images, still images) to detect anomalies and more particularly to computerized comparison of images (for example, video images, still images) to inspect components of power transmission towers and/or power transmission lines (collectively herein referred to as "tower components").

Inspection of utilities such as electric transmission towers is a regulated activity (that is, companies and/or government entities are required perform this activity). The inspection should detect parts that are broken, that may have rust, and so on. Conventionally, this inspection is performed using cranes that lift a cage. Person(s) in the cage visually inspect the different objects that make up the tower and/or power line structure. In other conventional tower component inspections, a helicopter is used. In other conventional tower component inspections, unmanned aerial vehicles (UAVs) have been used. More specifically, the UAV is equipped with a video camera that takes video images of the tower components for inspection purposes. In the case of inspection with video from a UAV, a person(s) are required to visually inspect the video from the UAV to detect problems, such as cracks, dirt, rust, etc. in tower components.

There exists software for comparing two images of the same object, captured at two different times, in order to detect changes in the status of the object captured in the two images.

It is known to create 3D models of objects that appear in multiple videos for the purpose of matching 3D models of an identical object that appears in multiple videos. For example, *Proceedings of the* 2004 IEEE Computer Society Conference on Computer Vision and Pattern Recognition, 2004. *CVPR* 2004 ("Rothganger et al.") states as follows: "Abstract: This paper presents a novel representation for dynamic scenes composed of multiple rigid objects that may undergo different motions and be observed by a moving camera. Multi-view constraints associated with groups of affine-invariant scene patches and a normalized description of their appearance are used to segment a scene into its rigid parts, construct three-dimensional protective, affine, and Euclidean models of these parts, and match instances of models recovered from different image sequences. The proposed approach has been implemented, and it is applied to the detection and recognition of moving objects in video sequences and the identification of shots that depict the same scene in a video clip (shot matching)."

SUMMARY

According to an aspect of the present invention, there is a method, computer program product and/or computer system for performing the following operations (not necessarily in the following order): (i) receiving a first video image that includes a first initial version infrastructure object image showing a first infrastructure object with the first initial version infrastructure object image being characterized by a first viewing vector; (ii) receiving a second video image that includes a second initial version infrastructure object image showing the first infrastructure object with the second initial version infrastructure object image being characterized by a second viewing vector that is at least approximately parallel to the first viewing vector; (iii) selecting the first initial version infrastructure image from the first video; (iv) analyzing, by machine logic, the second video image to determine that the second initial version infrastructure object image is a match with an identical instance of the first initial version infrastructure object image, with the analysis of the second video image including: (a) constructing, by machine logic, a set of three dimensional (3D) data model(s) of at least a portion of the environment around the first infrastructure object based, at least in part, upon the first and second video images, and (b) determining the match based, at least in part, upon the respective relationships of the first and second initial infrastructure object images to the set of 3D data model(s); and (v) determining, by machine logic, that a potential maintenance condition exists regarding the first infrastructure object based, at least in part, upon the first and second initial version infrastructure object images.

According to an aspect of the present invention, there is a method, computer program product and/or computer system for performing the following operations (not necessarily in the following order): (i) receiving a plurality of initial version infrastructure object images, with each initial version infrastructure object image of the plurality showing the same infrastructure object, and with all initial version infrastructure object images being characterized by, at least approximately, parallel viewing vectors; (ii) adjusting, by machine logic, at least one initial version infrastructure object image to obtain a plurality of adjusted infrastructure image objects respectively corresponding to the plurality of initial version infrastructure object images, with the plurality of adjusted infrastructure object images showing the same infrastructure object aligned with itself across the plurality of adjusted infrastructure object images; (iii) comparing, by machine logic, the adjusted infrastructure object images with each other to determine a difference data set corresponding to a set of differences between at least two of the plurality of adjusted infrastructure object images; and (iv) analyzing, by machine logic, the difference data set to determine that a potential maintenance condition exists regarding the infrastructure object shown in all of the plurality of initial version infrastructure images.

According to an aspect of the present invention, there is a method, computer program product and/or computer system for performing the following operations (not necessarily in the following order): (i) receiving a first video image that includes a first initial version infrastructure object image showing a first infrastructure object with the first initial version infrastructure object image being characterized by a first viewing vector; (ii) receiving a second video image that includes a second initial version infrastructure object image showing the first infrastructure object with the second initial version infrastructure object image being characterized by a second viewing vector that is at least approximately parallel to the first viewing vector; (iii) selecting the first initial version infrastructure image from the first video; (iv) analyzing, by machine logic, the second video image to determine that the second initial version infrastructure object image is a match with an identical instance of the first initial version infrastructure object image, with the analysis of the second video image including: (a) constructing, by machine logic, a three dimensional (3D) data model of at least a portion of the environment around the first infrastructure object based, at least in part, upon the first and second video images, and (b) determining the match based, at least in part, upon the respective relationships of the first and second initial infrastructure object images to the 3D data model; (v) adjusting, by machine logic, at least one of the first and second initial version infrastructure object image to obtain a plurality of adjusted infrastructure image objects respectively corresponding to the first and second initial version infrastructure object images, with the plurality of adjusted infrastructure object images showing the first infrastructure object aligned with itself across the plurality of adjusted infrastructure object images; (vi) comparing, by machine logic, the adjusted infrastructure object images with each other to determine a difference data set corresponding to a set of differences between at least two of the plurality of adjusted infrastructure object images; and (vii) analyzing, by machine logic, the difference data set to determine that a potential maintenance condition exists regarding the first infrastructure object.

DETAILED DESCRIPTION

Figure 1:
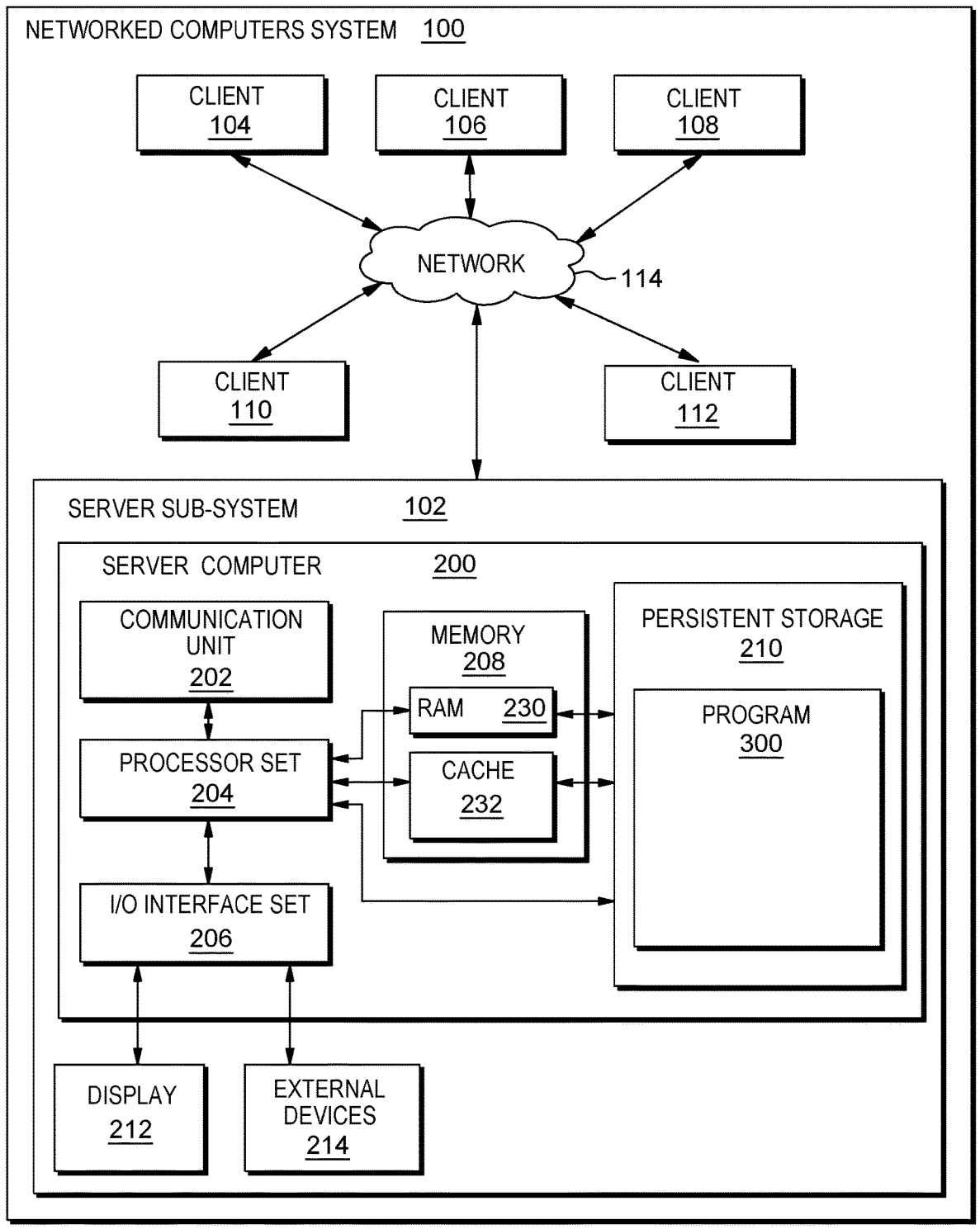
FIG. 1 is a block diagram view of a first embodiment of a system according to the present invention.

Some embodiments of the present invention are directed to machine logic (for example, software) for examining a large complex object that includes multiple components. For each type of component that composes the complex object under examination, there could be several instances. For example, in a single power tower, there are many metal rings and many insulators. In some embodiments, during the examination process, each instance of a component is compared to itself. In some embodiments, an instance is not to be compared to any other instances of similar components, but only compared to itself. For example, in a single power tower, each metal ring may be compared only to itself and not to other metal rings in the same power tower, or to metal rings in other power towers. Some embodiments solve the following problem: given two videos of a complex object described above—how to determine which images capture the same instance of an object. In some embodiments, the machine logic based determination of locating identical instances of the same component of a complex object includes: (i) generating a 3D (three dimensional) model of a large complex object; and (ii) using localization within the 3D model. It is possible to provide images that capture the same object (small component of the large object, for example, a specific ring from a power tower) and then compare those images. In some embodiments, one or more 3D models of the complex object are generated for the purpose of locating identical instances of the same component in a set of images (for example, still images, video images), but the comparisons used to determine how the object may have changed over time is based upon the located images of the identical instance and not upon the 3D model(s) that were built merely for the purpose of locating the corresponding images.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
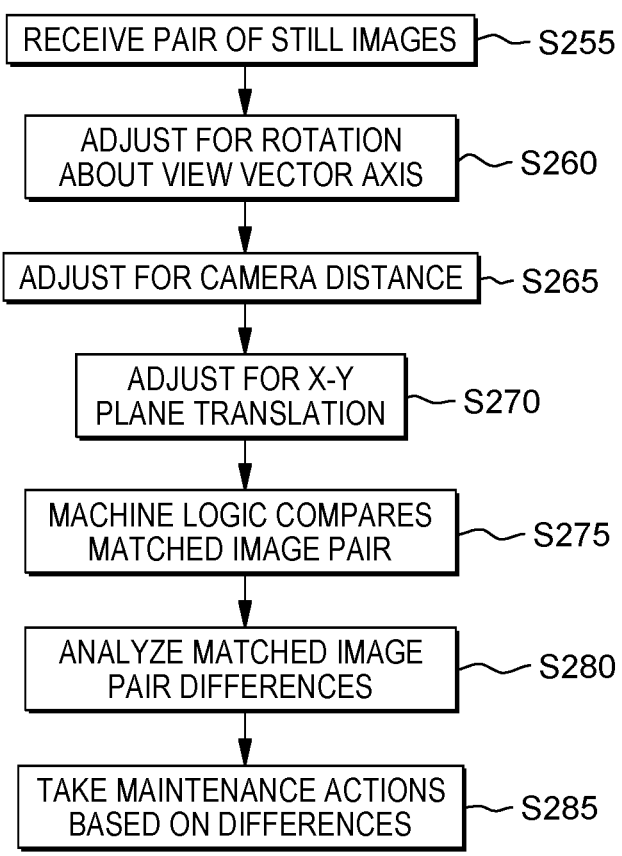
FIG. 2 is a flowchart showing a first embodiment method performed, at least in part, by the first embodiment system.
Figure 3:
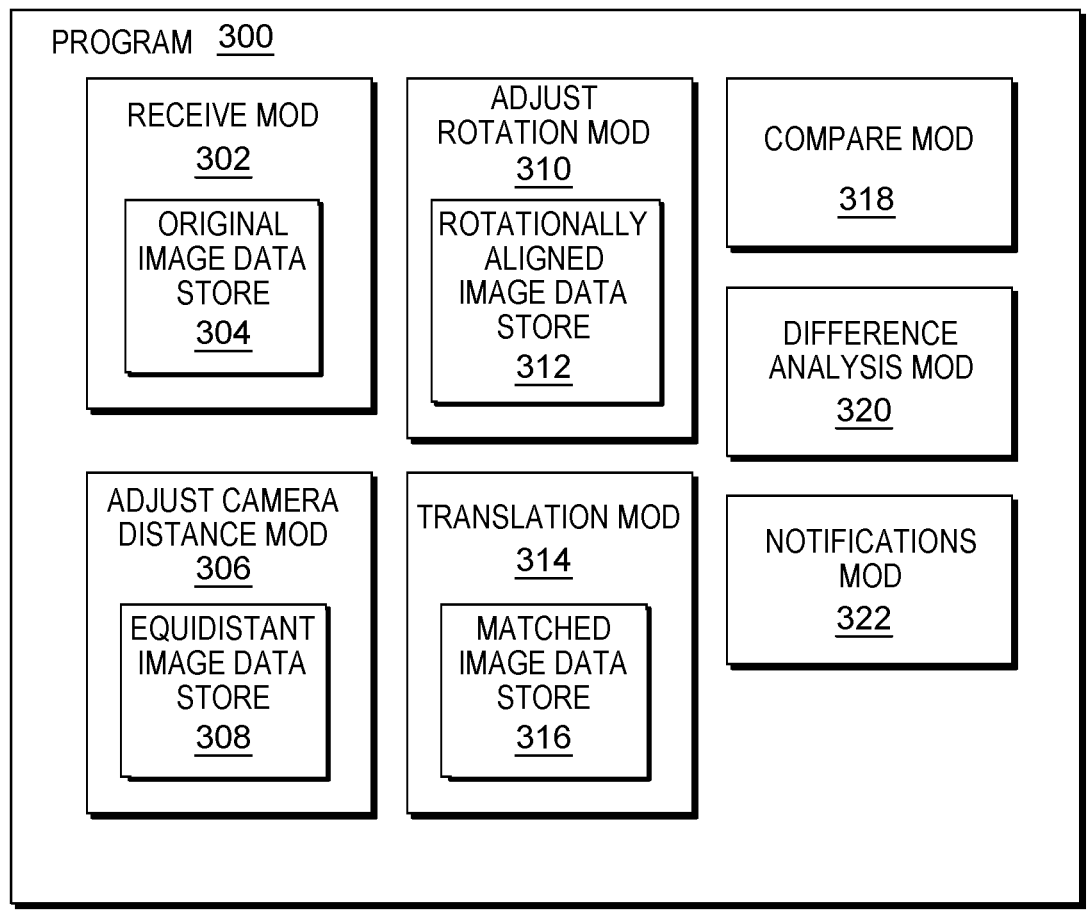
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 4A:
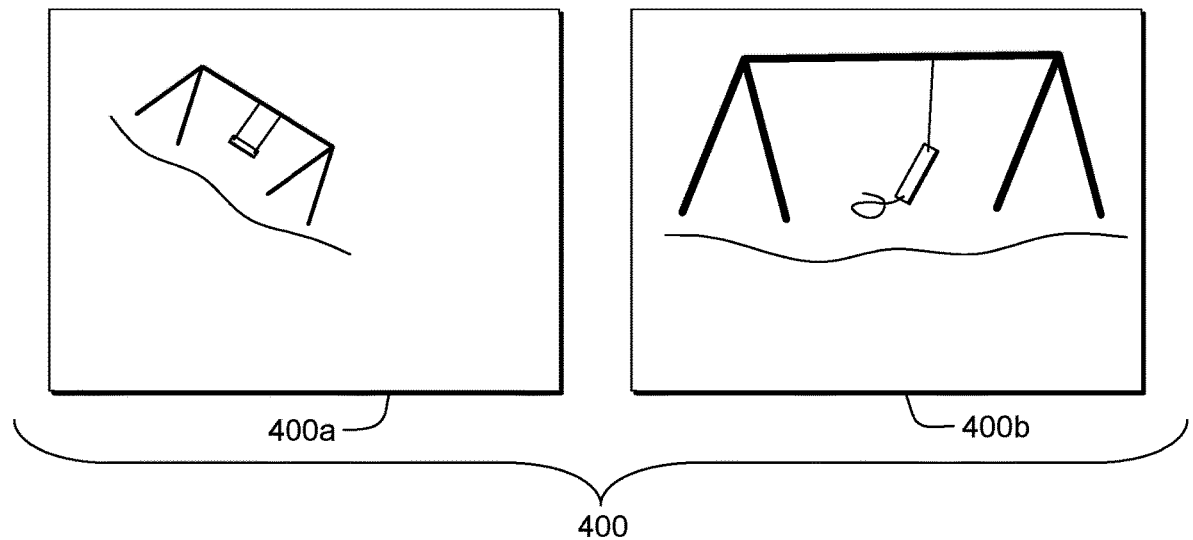
FIGS. 4A-4D are screenshot views generated by the first embodiment system.

Processing begins at operation S255, where receive module ("mod") 302 receives a pair of infrastructure images (see FIG. 4A at image 400a and image 400b) of the same infrastructure object (in this example, a swing set) taken from at least approximately parallel viewing vectors. Mod 302 stores images 400a, 400b in in original image data store 304. An "infrastructure object" is hereby defined to be any relatively permanent object that is subject to inspections and maintenance potentially resulting from the inspection. In this example: (i) image 400a is an image of the swing set taken approximately a year ago; and (ii) image 400b is a relatively recent image of the object.

In this example, the images were both taken by human inspectors. Alternatively, the images may be taken by other means, such as by driverless vehicles with mounted cameras. "Images" is hereby defined to include still images (as in this example), video capture images (see the following sub-section of this Detailed Description section for more on this), captures from time lapse photography (for example, from security cameras) and/or any combinations thereof. "Viewing vector" (also sometimes herein referred to as the "Z axis") is hereby defined as a spatial vector defined by a line between: (i) the camera capturing the image; and (ii) the infrastructure object captured in the image. The "image plane" (herein sometimes also referred to as the X-Y plane) is hereby defined to be the focal plane of the image (sometimes herein referred to as the image plane).

In this embodiment, the pair of images has been preselected so that they: (i) capture the same infrastructure object; (ii) have at least approximately parallel viewing vectors; and (iii) are taken from the same forward-reverse orientation (in this example, the front of the swing set, rather than the rear side of the swing set). Alternatively, and as will be discussed in detail in the next sub-section of this Detailed Description section, the pair (or larger set) of corresponding images for comparison may be selected by machine logic, with the selection being based upon three dimensional (3D) modelling and image tagging of the infrastructure object under inspection.

Figure 4B:
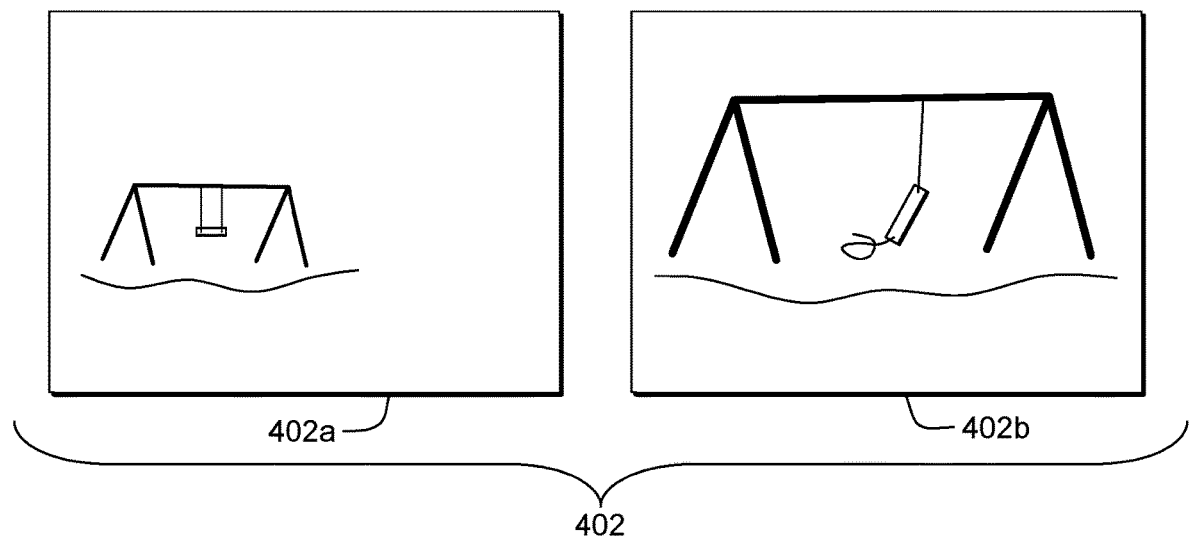

Processing proceeds to operation S260, where adjust rotation mod 310 adjusts one, or both, images so that they have the same angular orientation within the X-Y plane. After the adjust is made, a corresponding pair of rotationally aligned images is stored in rotationally aligned image data store 312. FIG. 4B shows the rotationally aligned pair of images 402a, b of the swing set in the example currently under discussion. In some embodiments, rotational alignment may not be needed.

Figure 4C:
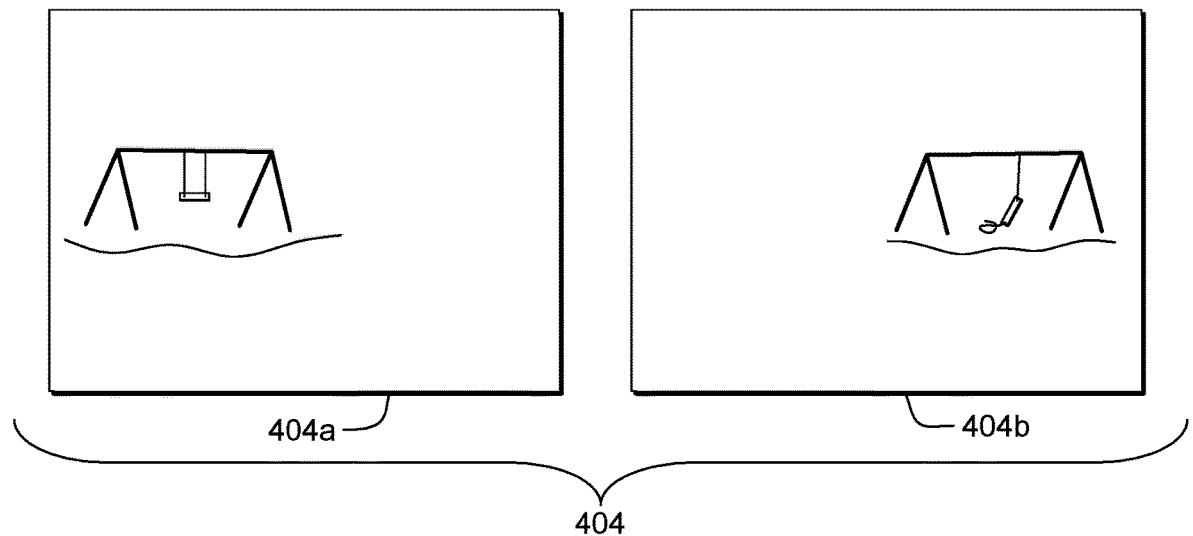

Processing proceeds to operation S265, where adjust camera distance mod 306 further adjusts the images so that they are the same size in the X-Y plane. The size adjusted images are stored in equidistant image data store 308. The equidistant images for this example are shown at images 404a, b in FIG. 4C. In some embodiments, equidistance type adjustment may not be needed.

Figure 4D:
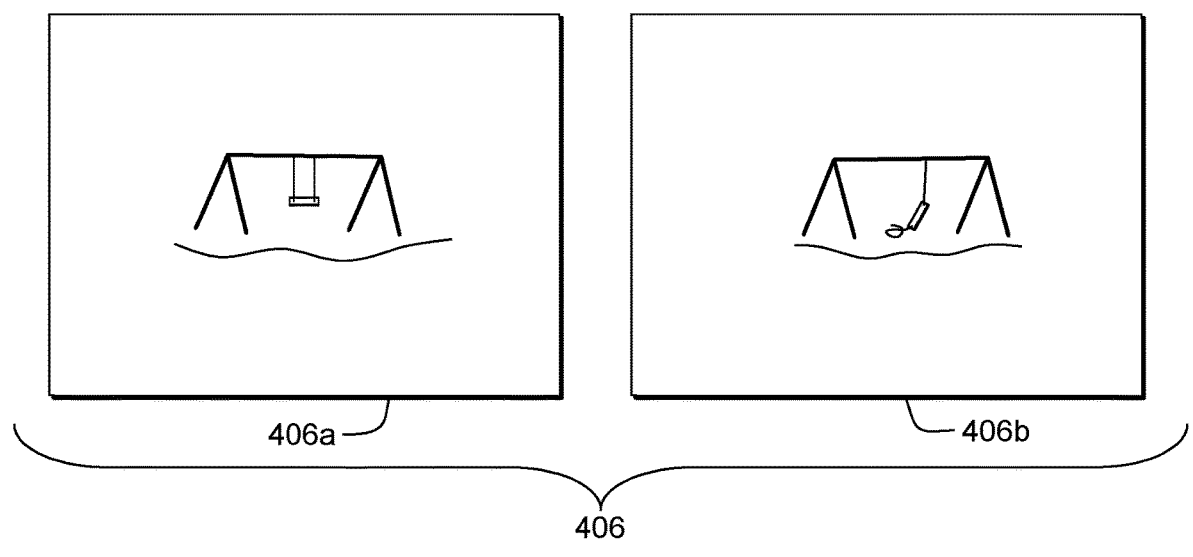

Processing proceeds to operation S270, where translation mod 314 further adjusts the images so that they appear at the same location in the X-Y plane. The images are now considered to be "matched" because they have been adjusted by the software to be as similar as possible to each other. The matched images are stored in matched image data store 316. The matched images for this example are shown at images 406a, b in FIG. 4D. In some embodiments, X-Y plane translational adjustment may not be needed. Although the images are "matched," review of images 406a, b shows that they are not identical because: (i) in the old version of the matched image (that is, image 406a) the swing set is not broken; but (ii) in the new version of the matched image (that is, image 406b) the swing set is broken.

Processing proceeds to operation S275, where compare mod 318 compares, by machine logic, matched images 406a, b to each other to determine that there is a significant difference between the matched pair of images. More specifically, in this example, image 406a has a swing with both swing cables intact, but the new version of the image 406b shows the seat of the swing has its left end lying on the ground and the left side cable lying on the ground.

Processing proceeds to operation S280, where difference analysis mod 320 analyzes the differences detected at operation S275, by machine logic, to determine that the differences are large enough to indicate a potential anomaly and a potential need for maintenance of the swing set.

Processing proceeds to operation S285, where notifications mod 322 sends an email notification (including images 406a, b) to a human inspector (that is, the user of client sub-system 104—see FIG. 1) to determine whether there is an actual need for a maintenance action. Alternatively, a potential anomaly could trigger other types of consequential action, such as, in the spirit of this example: (i) an order for a new swing set cable; and (ii) scheduled dispatch of a repair robot to go out and make the repair when the swing set cable is received into inventory.

III. Further Comments and/or Embodiments

Figure 6A:
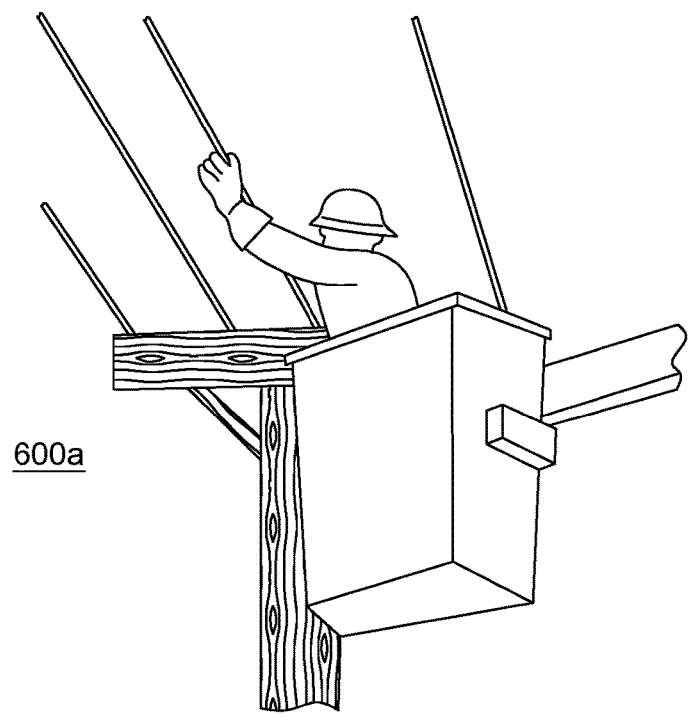
FIGS. 6A to 6C are a series of images helpful in understanding progression of tower component inspection technology.
Figure 6B:
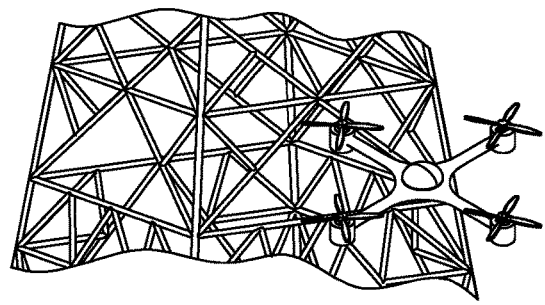
Figure 6C:
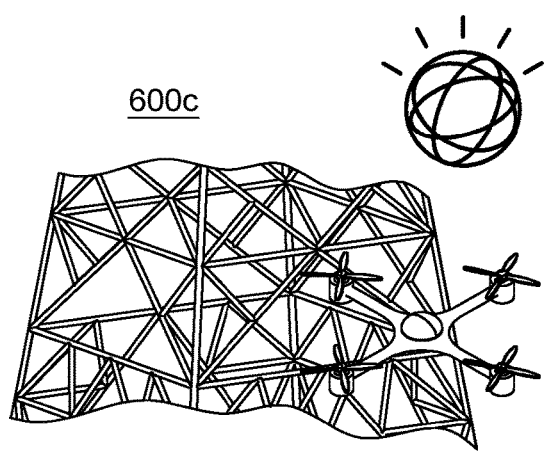

Some embodiments of the present invention recognize the following facts, potential problems and/or potential areas for improvement with respect to the current state of the art: (i) inspection of utilities such as electric transmission towers is costly and requires a lot of time; (ii) tower component inspection is expensive, time intensive, manual, fraught with human errors and judgment discrepancies between operators and technicians; (iii) companies are trying to assimilate analytics into the process (for example, to the video examination phase) so that it would more automatic and would require fewer employee hours; (iv) Images 600a, 600b, 600c of FIGS. 6A, 6B, 6C, respectively, show the progression from human based inspection to human inspection of UAV video to analytics based inspection of UAV video; (v) the way companies are trying to address this task is using machine learning, by trying to train discriminative classifiers that would be able to distinguish between parts that are in order or not (for example, distinguish between a cracked part and a non-cracked part, distinguish between a part with rust and a part without rust); (vi) this approach requires many tagged samples because there can be significant changes in the appearance of a given tower component over time; (vii) UAVs are being used to inspect industrial objects such as power transmission towers, cellular transmission towers (and more) by video capturing the objects and then manually inspecting the objects to find faulty parts; and/or (viii) many companies are trying to automate this procedure by using computer vision and machine learning but this task is difficult to solve using these techniques alone.

Figure 5:
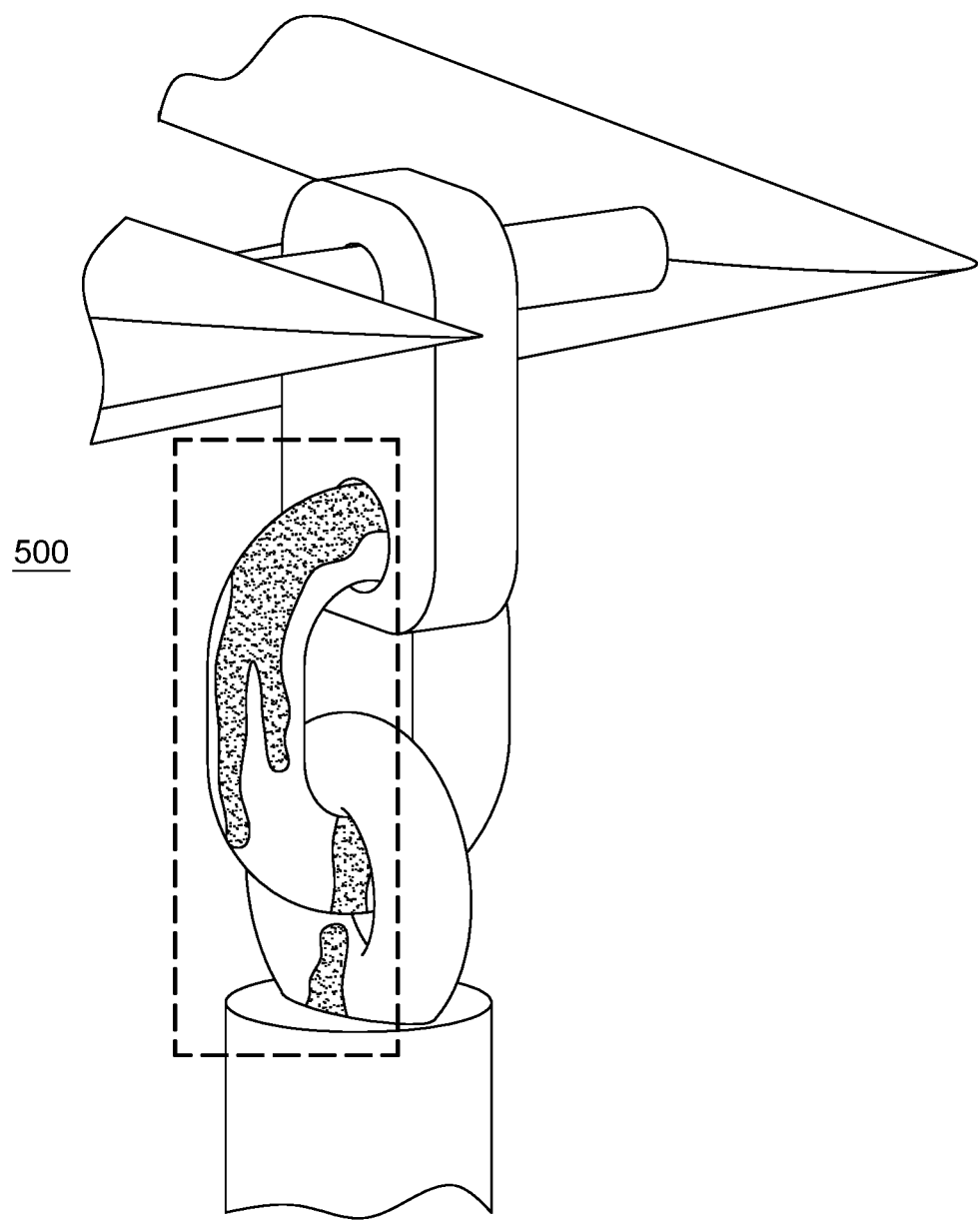
FIG. 5 is an image of a tower component helpful in understanding various embodiments of the present invention.
Figure 7:
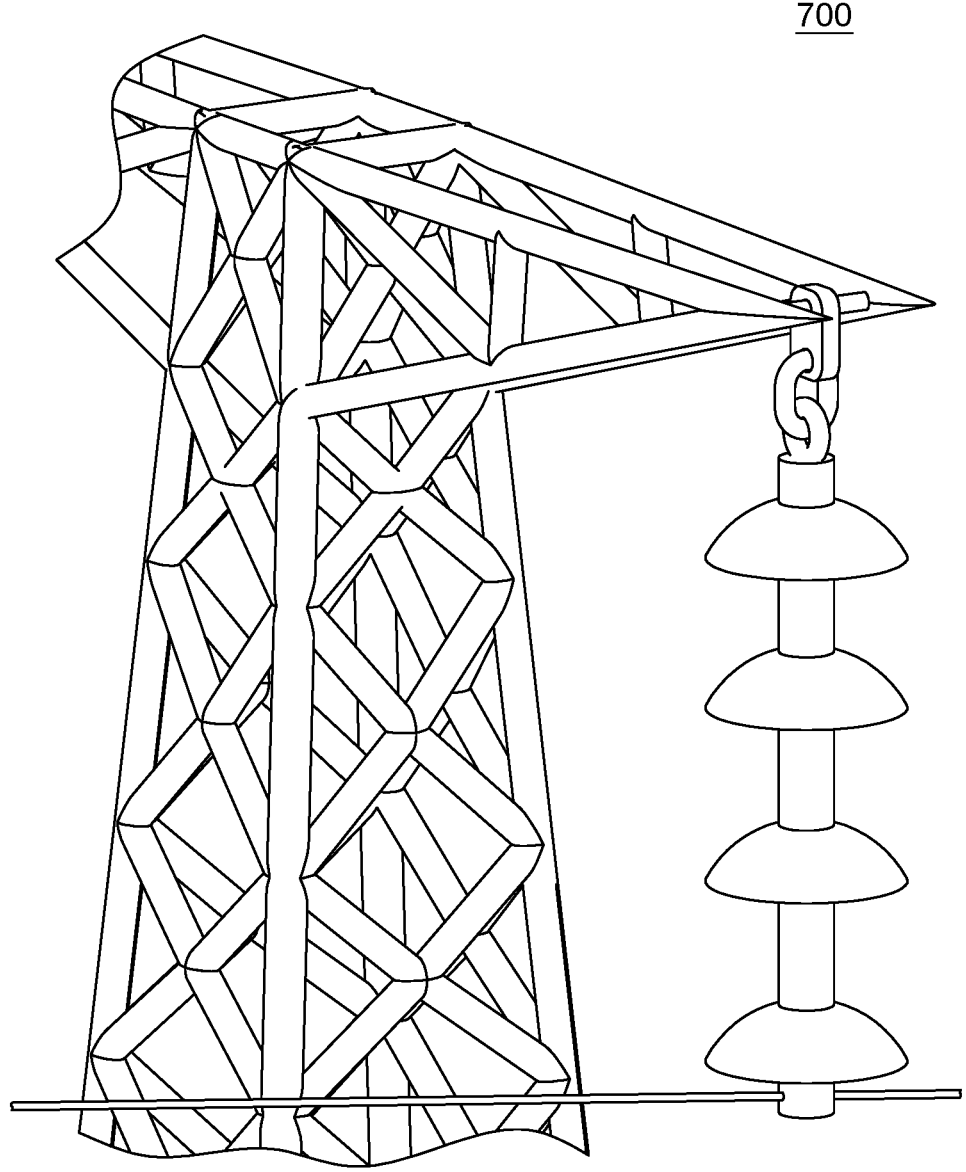
FIG. 7 is another image of a tower component helpful in understanding various embodiments of the present invention.

As an example of item (vi) of the list in the preceding paragraph, image 500 of FIG. 5 shows an example where paint has spilled onto a tower component, thereby changing its appearance. This can lead to a "false negative" when using analytics and/or machine learning (ML). A classifier (that is, a set of software and/or hardware that automatically classifies images into categories) misclassify this object in the "Not Acceptable" category based upon the spilled paint. Image 700 of FIG. 7 shows another type of tower component that is susceptible to inspection by systems and/or methods according to the present invention.

Some embodiments of the present invention may include one, or more, of the following features, characteristics and/or advantages: (i) use a different approach that can overcome the problems identified in the preceding paragraph; (ii) improved "cognitive computing" type inspections of images, such as tower components; (iii) instead of detecting faults in a single image, some embodiments use machine logic to compare an image with historical images of the same component, using videos that were taken in previous years (for example, in previous inspections); (iv) by comparing new images of an object to previous images of the same object, changes that occurred to this object (for example, crack, rust etc.) can be more accurately identified; (v) the problem of the "false negative," mentioned above, is overcome because past images of the object under inspection itself are used as a baseline for determining changes in visual appearance of the object under inspection; and/or (vi) some embodiments do this comparison using 3D (three dimensional) reconstruction, 3D localization, 2D image alignment and then use image processing techniques.

Figure 8:
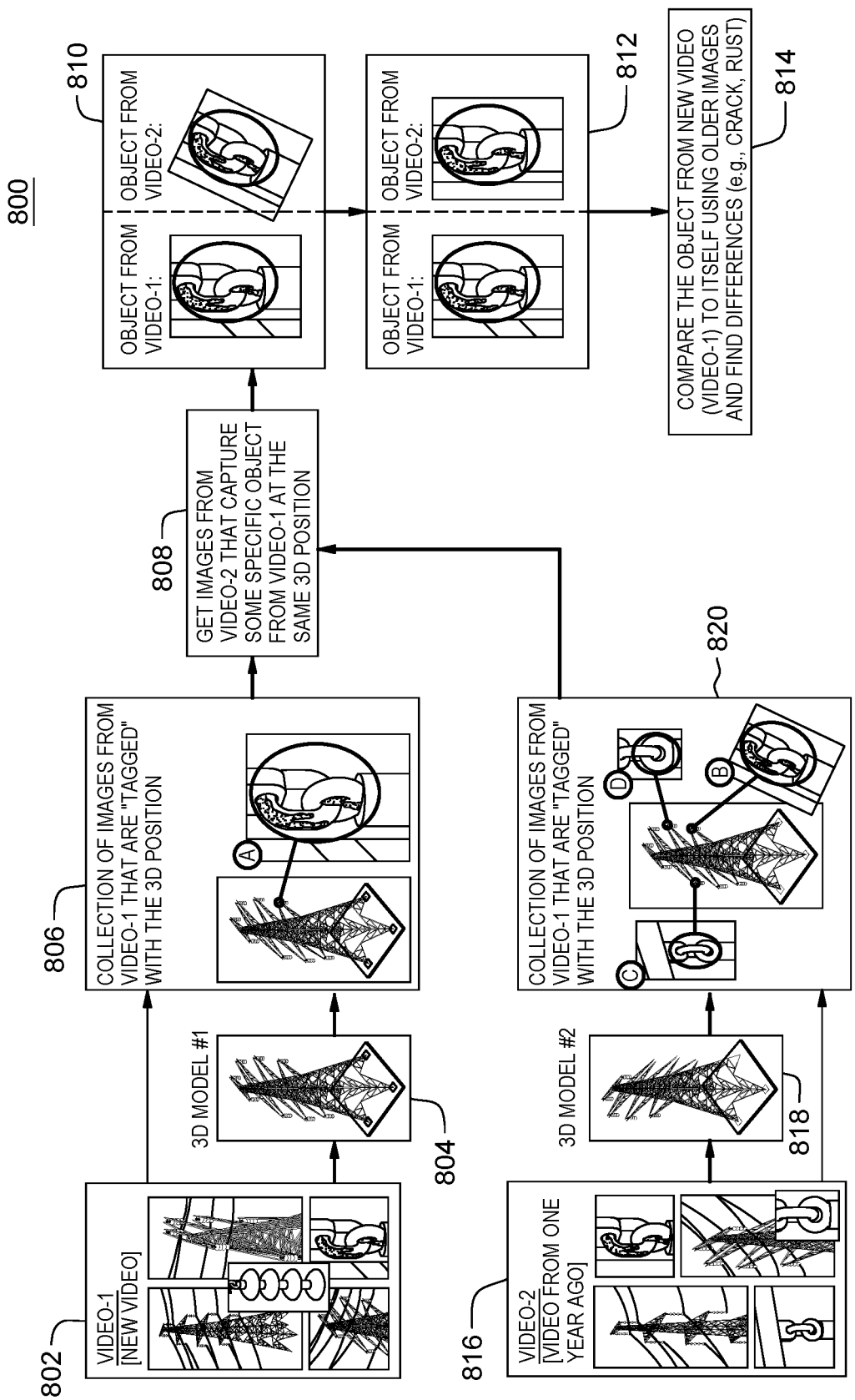
FIG. 8 is a flowchart showing a second embodiment of a method according to the present invention.

As shown in FIG. 8, flowchart 800 provides a high level description of an embodiment of a computerized inspection method according to the present invention, which will be further discussed below. Flowchart 800 includes: receive new video block 802; new 3D reconstruction block 804; new component image localization block 806; identify specific component block 808; identify corresponding image pairs block 810; 2D image alignment block 812; semantic differences block 814; receive old videos block 816; old 3D reconstruction block 818; and old component image localization block 820. The tower and tower component images in flowchart 800 can be used to help the user visualize the operations of flowchart 800. These operations will be explained in more detail in the following paragraphs.

At the operation performed at receive new video block 802, a new video of a tower being inspected are received by a computer system according to the present invention. In this embodiment, these images come from a camera attached to a UAV. At a parallel operation performed at receive old videos block 816, old (sometimes referred to as "historical") video(s) of the same tower under inspection are received by the computer system.

At the operation performed at new 3D reconstruction block 804, 3D reconstruction, by machine logic, is performed on the new video image of the tower under inspection. The 3D reconstruction may be any machine logic for performing 3D reconstruction from a 2D video image that is now known or to developed in the future. At the parallel operation performed at old 3D reconstruction block 818, 3D reconstruction, by machine logic, is performed on the old video image(s) of the tower under inspection that were received at block 816.

At the operation performed at new component image localization block 806, images from the new video are tagged, by machine logic, with their respective three dimension locations, using the new 3D model of the tower (also called 3D model #1) as a frame of reference for the tagging coordinates. Both the new video (from block 802) and 3D model #1 (from block 804) are inputs to this "3D localization process." At the parallel operation performed at old component image localization block 820, images from the old video(s) are tagged, by machine logic, with their respective three dimension locations, using the old 3D model of the tower (also called 3D model #2) as a frame of reference for the tagging coordinates. Both the old video(s) (from block 816) and 3D model #2 (from block 818) are inputs to this "3D localization process."

At the operation performed at identify specific component block 808, the given tower component being inspected by the method of flowchart 800 are selected from the larger universe of all of the images of the new video and old video(s). This selection is performed by machine logic and is based upon the tagging resulting from the 3D localization process of blocks 806 and 820. That is: (i) the 3D location of the given tower component under inspection, with respect to the tower taken as a whole, is known; so (ii) images tagged with this known 3D location will show images of the given tower component. This selected set of images will show the given tower component under inspection from many different perspectives.

At the operation performed at identify corresponding image pairs block 810, machine logic further selects, from the set of given tower component under inspection images selected at block 808, pairs (or larger subsets) of images that show the given tower component under inspection from at least approximately the same perspective.

At the operation performed at 2D image alignment block 812, machine logic performs two dimensional alignment as between the pairs of images selected at block 810. To put it in geometry terms: (i) block 810 matches subsets of images that have approximately the same viewing vector from camera to given tower component; and (ii) block 812 perform further alignment by: (a) angular adjustment of the respective images of subset about the viewing vector ray, and (b) any small translations of the respective images of subset within the planes of the respective images.

At the operation performed at semantic differences block 814, machine logic compares each aligned subset of images of the given tower component under inspection to find differences, which may be indicative of cracks, rust and/or other anomalies that need to be addressed by tower maintenance operations (not shown in FIG. 8). Further discussion of FIG. 8 will be set forth in the following paragraphs.

As shown in blocks 806 and 820, object in image A is compared to itself using historical image B and without comparing to images C, D. Although the objects in image C, D seem similar to object A, they are different objects and should not be compared to A. Using the method of flowchart 800, every object is visually compared to itself in the historical video/s and so changes and damage can be detected.

Figure 9:
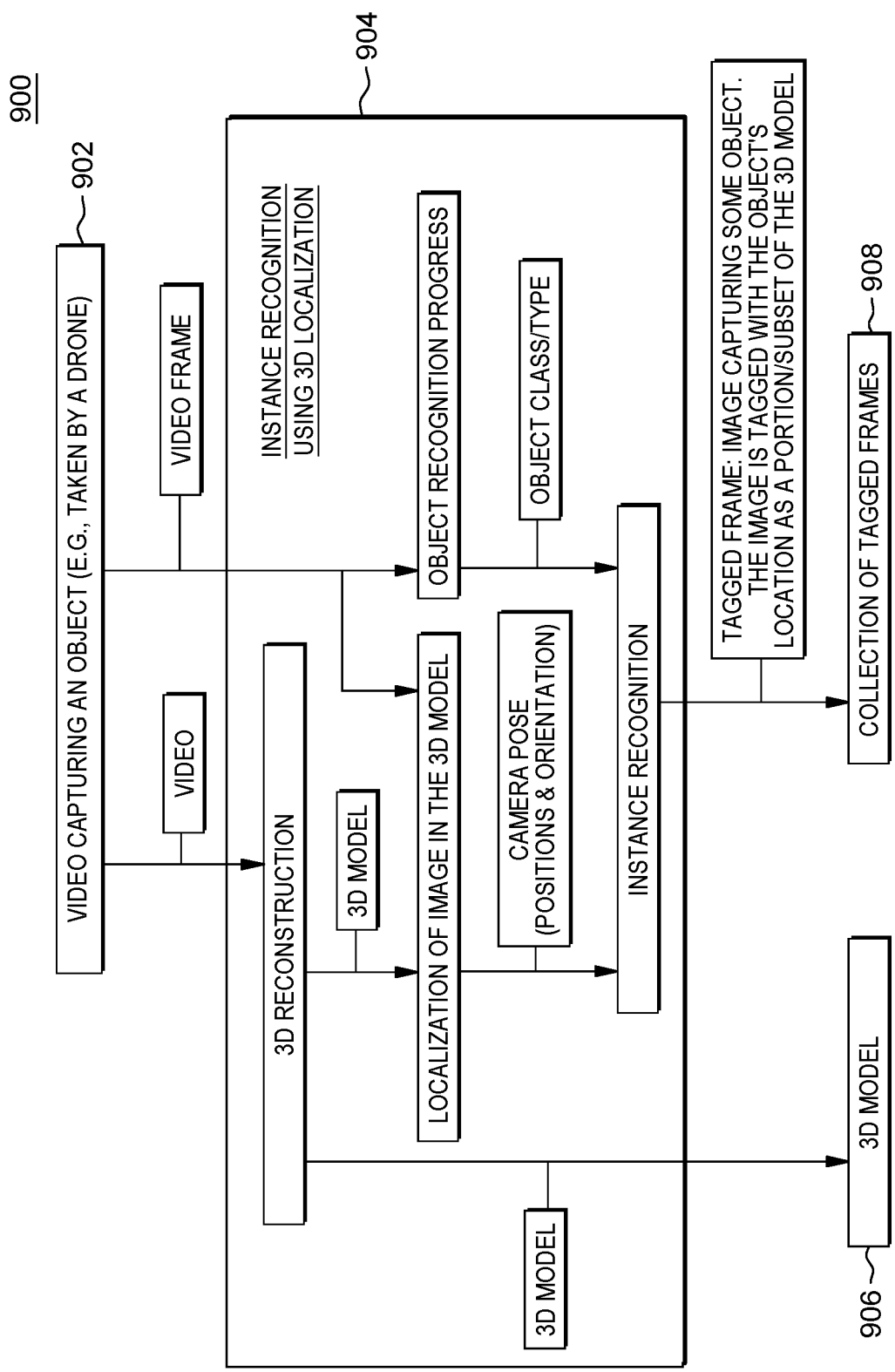
FIG. 9 is a flowchart showing a third embodiment of a method according to the present invention.

Flowchart 900 of FIG. 9 shows a method of "Instance recognition using 3D localization" used in some embodiments of the present invention. Flowchart 900 includes: video captioning block 902; reconstruction/localization/recognition block 904; collection block 908; and 3D model block 906. In the method of flowchart 900, for each frame sent from block 902 to block 904, a tagged frame is generated by block 904 and sent to block 908 for collection.

Figure 10:
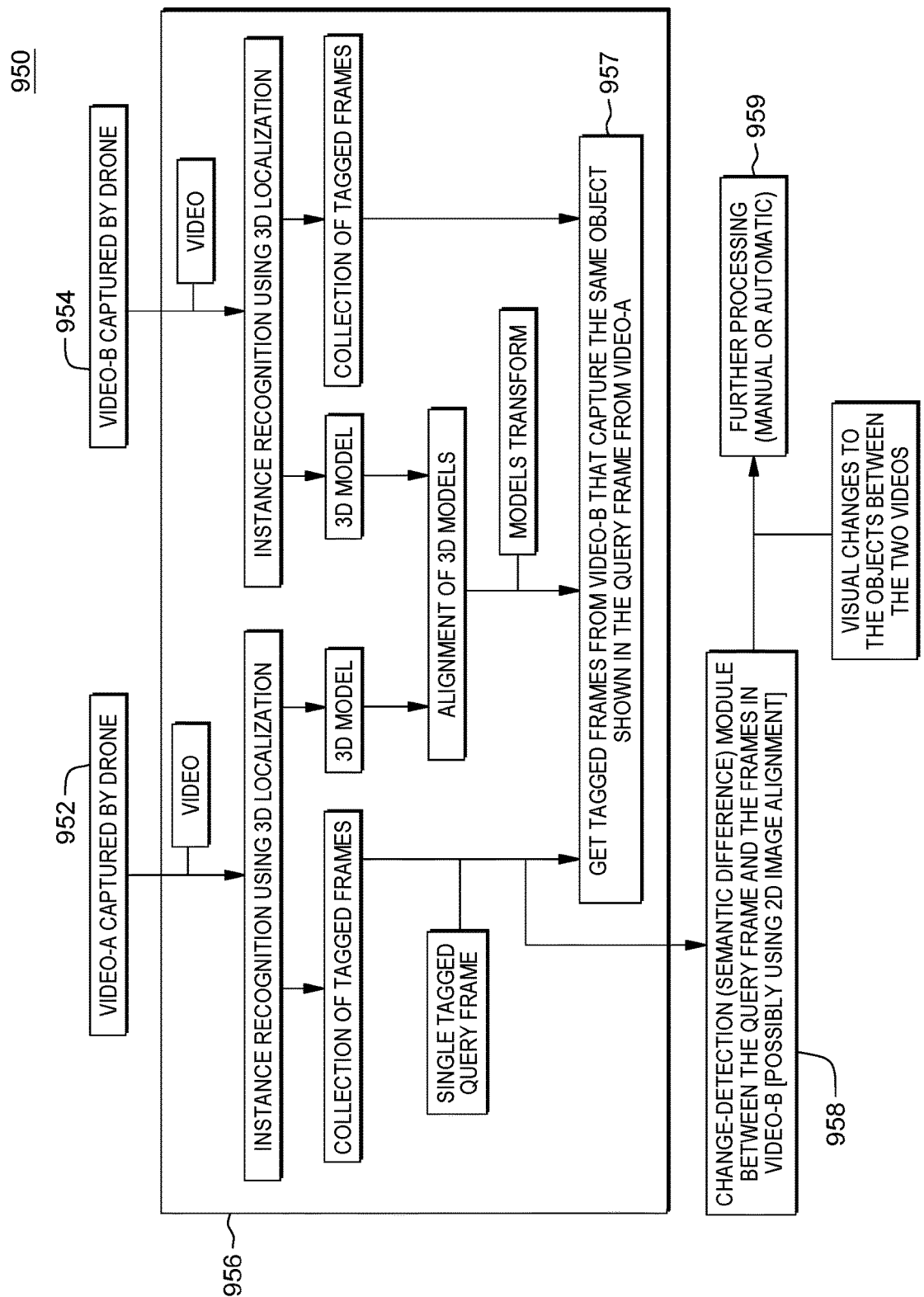
FIG. 10 is a flowchart showing a fourth embodiment of a method according to the present invention.

Flowchart 950 of FIG. 10 shows another method according to the present invention. Flowchart 950 includes: video A capture block 952; video B capture block 954; recognition/tagging/alignment/image-matching block 956; get tagged frames sub-block 957; semantic difference block 958 and further processing block 959. In some embodiments, using the operation(s) of recognition/tagging/alignment/image-matching block 956, system is built that allows a user to search for historical videos that capture some 3D position in a 3D model. In the method of flowchart 950, for each frame originating from block 952 and collected as a tagged frame in block 956, there is obtained a set of frames showing the same object in the video from block 954 using the operation(s) of sub-block 957. The method of flowchart 950 finds changes that happened for this object using the operation(s) of block 958. By repeatedly activating the operations of blocks 956 and 958, all of the tower components are inspected by comparing current images to historical images of the same components to find changes in the corresponding images that are potentially indicative of anomalies and/or the need for tower component maintenance.

Some embodiments of the present invention may include one, or more, of the following features, advantages, characteristics and/or operations: (i) instead of detecting faults in a single image, the image is compared, by machine logic, with historical images of the same component; (ii) using/leveraging videos that were taken in previous years (for example, in previous inspections); (iii) by comparing each object to itself, changes that occurred to this object (e.g., crack, rust, etc.) are detected by machine logic; (iv) in order to accomplish this comparison, some embodiments use 3D reconstruction, 3D localization, 2D image alignment and then use image processing techniques; (v) analysis that can be accomplished completely automatically (see definition, below) or at least without substantial human intervention; (vi) aligned with a focus in cognitive services and analytics; and/or (vii) this concept can be used in various applications/use cases (for example, insurance claim processing of houses, remote inspections).

Some embodiments are directed to a method for change detection in elements that compose large industrial objects. For example, some embodiments can be applied to inspect a powerline tower and detect in each powerline tower if there was a change in a specific element (for example, insulator string, ring such as a ring, cross arm). A powerline tower has many objects of the same type, for example, it has many insulators strings and the goal is to compare each insulator string to itself in a historical video. To do that, one needs to distinguish between different instances of the same element type (so that we'll compare an object to itself and not to another object that looks the same). One also needs to compare an object to itself using images that capture the object from the same perspective, so that the process of the change detection will have more precise results.

Some embodiments use a combination of (1) 3D reconstruction, (2) 3D localization, (3) 3D models alignment, (4) Object recognition, (5) 2D image alignment in order to perform the following: (a) detect an instance of object-Z from video-A that appears in image-X; (b) find image-Y in video-B that captures the same instance of object-Z that was video captured from the same perspective as in image-X; (c) do this although there are many instances of type object-Z in the videos; and (d) align both images and find changes in the object.

Some embodiments of the present invention may include one, or more, of the following features, advantages, characteristics and/or operations: (i) visually detects changes in small objects that comprise an electric tower; (ii) find corresponding images of the same small object from different videos using 3D techniques and where GPS readings are not accurate enough; (iii) find corresponding images of the same small object from different videos using 3D techniques.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Video image: includes multiple constituent images (generally, with modern video techniques the constituent images are successive still images displayed at a frame rate) in a single "video image"; for example, when a 3D model is built using a video image, this building will exploit multiple (possibly all) of the constituent images of the "video image."

What is claimed is:

1. A computer-implemented method comprising:
receiving a plurality of initial version infrastructure object images, with each initial version infrastructure object image of the plurality showing the same infrastructure object, and with all initial version infrastructure object images being characterized by, at least approximately, parallel viewing vectors;
adjusting, by machine logic, at least one initial version infrastructure object image to obtain a plurality of adjusted infrastructure image objects respectively corresponding to the plurality of initial version infrastructure object images, with the plurality of adjusted infrastructure object images showing the same infrastructure object aligned with itself across the plurality of adjusted infrastructure object images;
comparing, by machine logic, the adjusted infrastructure object images with each other to determine a difference data set corresponding to a set of differences between at least two of the plurality of adjusted infrastructure object images;
analyzing, by machine logic, the difference data set to determine that a potential maintenance condition exists regarding the infrastructure object shown in all of the plurality of initial version infrastructure images;
wherein the adjustment of the at least one initial version infrastructure object images to obtain a plurality of adjusted infrastructure object images includes:
adjusting, by machine logic, an angular orientation of an image plane of at least one of the plurality of initial version infrastructure object images so that all of the plurality of adjusted infrastructure object images show the same infrastructure object at, at least approximately, the same angular alignment,
capturing, at a plurality of different points in time, a plurality of video images that include video images of the same infrastructure object; and
selecting the plurality of initial version infrastructure object images from the plurality of video images.

2. The method of claim 1 further comprising:
responsive to the determination of the existence of the potential maintenance condition, sending out, automatically and by machine logic, a notification of the potential maintenance condition.

3. The method of claim 1 wherein the adjustment of the at least one initial version infrastructure object images to obtain a plurality of adjusted infrastructure object images includes:
translating, by machine logic, for at least one of the plurality of initial version infrastructure object images a position of the same infrastructure object within the image plane so that all of the plurality of adjusted infrastructure object images show the same infrastructure object at, at least approximately, the same position within the image plane.

4. The method of claim 1 wherein the adjustment of the at least one initial version infrastructure object images to obtain a plurality of adjusted infrastructure object images includes:

adjusting, by machine logic, an angular orientation of an image plane of at least one of the plurality of initial version infrastructure object images so that all of the plurality of adjusted infrastructure object images show the same infrastructure object at, at least approximately, the same angular alignment; and translating, by machine logic, for at least one of the plurality of initial version infrastructure object images a position of the same infrastructure object within the image plane so that all of the plurality of adjusted infrastructure object images show the same infrastructure object at, at least approximately, the same position within the image plane.

5. The method of claim 1 wherein the capturing is performed by unmanned aerial vehicle(s) equipped with video camera(s).

* * * * *